Nov. 27, 1945.  A. C. RUGE  2,390,038
TEMPERATURE COMPENSATED GAUGE
Filed Sept. 12, 1944
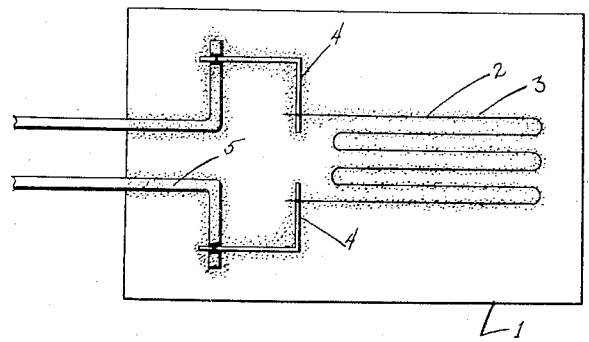
INVENTOR
Arthur C. Ruge
BY
ATTORNEY.

Patented Nov. 27, 1945

2,390,038

UNITED STATES PATENT OFFICE 2,390,038

TEMPERATURE COMPENSATED GAUGE

Arthur C. Ruge, Cambridge, Mass., assignor to The Baldwin Locomotive Works, a corporation of Pennsylvania Application September 12, 1944, Serial No. 553,784

8 Claims. (Cl. 201—63)

This invention relates to bonded wire type strain gauges and more particularly to temperature compensated gauges of such type.

Bonded wire type gauges of various types are well-known of which my Reissue Patent No. 22,589 represents the general type of gauge disclosed herein. This general type of gauge consists of a pair of relatively heavy leads to which the fine resistance wire or filament is soldered. The filament and the inner ends of the leads are preferably bonded to a flexible membrane such as paper which, in turn, is bonded to a member whose strain is to be measured, although the filament and leads may, if desired, be bonded directly to the surface of the member. In certain special applications of this type of gauge, particularly where very large deformations are involved, difficulty may be experienced with fatigue and hysteresis which arise from mechanical sources and in many instances from rough handling in applying and using the gauge. In addition, temperature compensation is desirable for a few special kinds of material, but also to permit gauges of uniform temperature characteristics to be made from filament wire of varying temperature characteristics, thereby to expedite the manufacture of high quality gauges.

It is an object of my invention to provide an improved bonded wire type gauge that has a high degree of freedom from fatigue and hysteresis and has effective temperature compensation, whereby the gauge may be used on material having an extraordinary degree of elasticity, or may be adapted for application to a test member whose material has a large or small temperature coefficient of expansion, or whereby gauges may be easily manufactured so as to have uniform characteristics even though the filament wire from different batches of wire lacks uniformity.

A further object is to provide an improved gauge which accomplishes the foregoing advantages in a relatively simple, economical and effective manner while at the same time having a high degree of sensitivity, responsiveness and accuracy together with ease of application to a member whose strain is to be measured.

Other objects and advantages will be more apparent to those skilled in the art from the following description of the accompanying drawing in which the figure is a plan view of my improved gauge considerably enlarged from its actual size for purposes of clarity.

In the specific embodiment of the invention disclosed herein, I have shown a membrane preferably in the form of a thin piece of paper 1 upon which a fine wire filament 2 is bonded throughout its entire length by suitable cement 3. The filament materials and the kinds of suitable cement are fully disclosed in various patents of mine and E. E. Simmons, Jr., relating to this general type of gauge and hence further description thereof is not deemed necessary as they are well-known to those skilled in the art. It should be pointed out, however, for the purpose of explaining certain functional relationships that the filament 2 preferably has a diameter of 1 or 1½ mils and is frequently made of such material as "Advance" wire. A pair of combined lead and temperature compensating wires 4 preferably arranged with right angled ends have soldered or other satisfactory connections with the ends of filament 2 where the latter overlap such leads. The wires 4 are preferably, but not necessarily, bonded throughout their length to membrane 1. A main or second set of leads 5, preferably with right angled ends, have soldered or other connections with the temperature compensating leads 4. It will be noted that the main leads 5 are relatively heavy compared to the leads 4 which, in turn, are somewhat heavier than the filament wire 2. Hence the main leads 5 are enormously larger than the filament wire 2. Normally the main leads 5 would be preferably of the order of 200 times the cross-sectional area of the filament wire in order to provide a substantial lead to which instrument wires might be connected or soldered. The combined lead and temperature compensating wires 4 are preferably about 4 to 10 times the cross-sectional area of the filament 5. The leads 4 are preferably made of any suitable material and of such length that will exactly offset the temperature coefficient of the filament 2. Thus, by choosing small size lead wires 4 of proper resistance and temperature coefficient, it is possible to utilize these wires as temperature compensation for the filament 2. For example, if the available filament wire happens to have a small negative coefficient when the gauge is attached to a given metal, lead wires 4 might be made of a properly selected length of very fine copper wire which will exactly offset the negative coefficient of the filament. The possibilities of this combination are of great practical value in using usual commercially available wire which ordinarily from one batch to the next would produce erratic temperature compensation for precision work. It is thus possible to manufacture gauges having a uniform temperature efficient of resistance which offers many advantages, and I can make one type of gauge for use on aluminum and another for steel or other material.

In addition to the foregoing temperature compensating feature, I am able to minimize to a high degree any tendency toward hysteresis or fatigue. In accordance with my present theory, these particular improvements are accomplished by reason of the fact that the relatively large lead wires 5 cannot be perfectly bonded to the membrane by means of nitro-cellulose cements, Bakelite, or other usual cements and, therefore, when strain is applied to the gauge after being bonded in its entirety to a member under test the lead wires 5 must of necessity slip somewhat, thus causing small but measurable inaccuracies in the measurement of strain. This factor is generally negligible when the strains are below .0006 inch per inch but it may become appreciable when the strains are large, say .002 inch per inch, as is commonly encountered in high strength steel and in certain aluminum alloys.

If the fine wire filament 2 were joined directly to the leads 5, it is seen that the foregoing slippage would adversely affect the consistency and accuracy of the gauge and, in addition, the relative size of the filament compared to the main leads would cause a sharp discontinuity of strain in going from the heavy lead wire into the filament. On the other hand, the reason slippage at the junction of leads 4 and 5, if it should occur, is not serious is that lead 4, being of low resistance relative to filament 2, does not contribute appreciably to the over-all strain sensitivity of the gauge.

However, in my present arrangement the intermediate combined lead and temperature compensating wires 4 permit a very low stress concentration at the juncture between the leads 4 and filament 2 with the result that any distortion of the main leads 5 will not cause breakage or slippage between the wires 4 and filament 2.

The structural arrangement of having both sets of leads bent into right angle portions with corresponding transverse and longitudinal portions arranged parallel to each other is conducive to making perfect connections combined with compactness and simplicity of manufacture.

From the foregoing disclosure it is seen that I have provided a gauge of the bonded wire type which permits this type of gauge to have a high degree of stability and freedom from many adverse conditions which may be present under certain special conditions of operation and tests. My improved gauge is economical, compact and reliable without sacrificing any of the precision qualities for which gauges of this general type are known.

It will of course be understood that various changes in details of construction and arrangement of parts may be made by those skilled in the art without departing from the spirit of the invention as set forth in the appended claims.

I claim:

1. A strain gauge comprising, in combination, a filament of material whose electrical resistance varies in accordance with its strain adapted to be bonded throughout its length to a member subject to strain, a pair of combined lead and temperature compensating wires electrically connected to the respective ends of said filament and adapted to be subject to substantially the same temperature as said filament, said wires being of a material and of such length that their temperature coefficient and resistance will compensate for temperature changes of the filament, and a second pair of leads electrically connected to said temperature compensating wires and forming an external connection for the strain gauge, said combined lead and temperature compensating wires having a cross-sectional area that is larger than the filament but smaller than said second pair of leads thereby substantially to prevent transmission of mechanical forces from said second pair of leads to the filament in the event of any movement of said second pair of leads.

2. The combination set forth in claim 1 further characterized in that said combined lead and temperature compensating wires are angularly bent with the filament connected to one angle portion and the second leads connected to the other angled portion.

3. The combination set forth in claim 1 further characterized in that said combined lead and temperature compensating wires are angularly bent with the filament connected to one angular portion and the second leads having angularly bent portions connected to the other angular portion of the wires.

4. The combination set forth in claim 1 further characterized in that the combined lead and temperature compensating wires are arranged with longitudinal and transverse angular portions and the second pairs also have transverse and longitudinal portions, the transverse and longitudinal portions of the respective wires and second leads being arranged substantially parallel to each other.

5. The combination set forth in claim 1 further characterized in that the filament has substantially parallel strands terminating at a common end at which all of said wires and second leads are located.

6. The combination set forth in claim 1 further characterized in that said filament, wires and second leads are all commonly bonded to a membrane which in turn is adapted to be bonded to a member subject to strain.

7. The combination set forth in claim 1 further characterized in that the combined lead and temperature compensating wires have a cross-sectional area approximately intermediate that of the filament and second set of leads.

8. A strain gauge comprising, in combination, a filament of material whose electrical resistance varies in accordance with its strain adapted to be bonded throughout its length to a member subject to strain, a pair of lead wires electrically connected to the respective ends of said filament at an angle thereto, and a second pair of leads electrically connected to said other lead wires and forming an external connection for the strain gauge, the first set of lead wires being of smaller cross sectional area than the second set but larger than that of the filament.

ARTHUR C. RUGE.